UNITED STATES PATENT OFFICE.

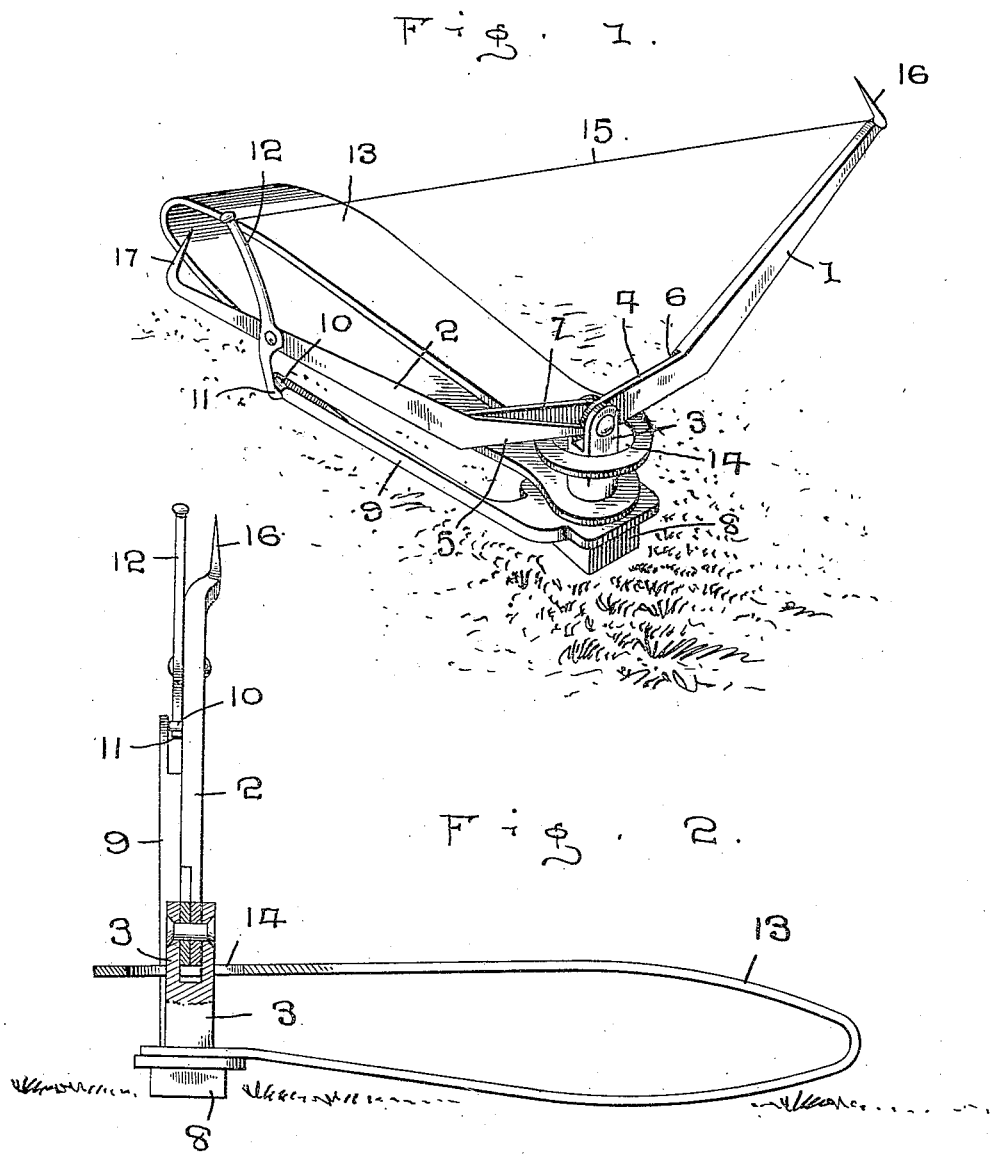

NILS A. BOE, OF TERRACE, MINNESOTA.

TRAP.

955,751.  Specification of Letters Patent.  Patented Apr. 19, 1910.

Application filed July 7, 1909. Serial No. 506,327.

*To all whom it may concern:*

Be it known that I, NILS A. BOE, a citizen of the United States, residing at Terrace, in the county of Pope and State of Minnesota, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class adapted to be used in catching rodents and other animals and my object is to provide a device of this class whereby the jaws of the trap will be moved together by means of a spring.

A further object is to provide a trigger for holding the jaws in their set position.

A still further object is to provide a trip rope or wire which when engaged by the animal will release the trigger and permit the jaws to move together and a still further object is to provide means for impaling the animal on the jaws.

Other objects and advantages will be hereinafter referred to and more particularly pointed out in the claim.

In the accompanying drawings forming part of this application, Figure 1 is a perspective view of the trap in its set position, and, Fig. 2 is an elevation partly in section of the trap.

Referring to the drawings in which similar reference numerals designate corresponding parts throughout the several views, 1 and 2 indicate the jaws of my improved trap, the meeting ends of which jaws are at an obtuse angle to the opposite ends of the jaws and when the jaws are set, the meeting end portions are substantially in the same plane with each other and extended horizontally, while the remaining portions of the jaws extend upwardly and outwardly.

The meeting ends of the jaws are hingedly secured in the bifurcated end of a post 3, said meeting ends 4 and 5, respectively, of the jaws 1 and 2 being preferably reduced in thickness one-half their width to form offsets 6 and 7, the end 4 registering with the offset 7 and the end 5 with the offset 6, in which manner the two jaws will face each other when in their closed position.

The lower end of the post 3 is provided with a head 8 and fixed around the post and resting on said head, is an arm 9, said arm extending outwardly and upwardly in alinement with the jaw 2, the upper end of said arm being bifurcated and provided with a cross bar 10, with which engages the hooked end 11 of a trigger 12, said trigger being pivotally attached to the jaw 2 at a point adjacent the outer end of the jaw and it will be readily seen that as long as the hooked end remains in engagement with the cross bar 10, the jaw 2 will be held in its open position.

A substantially U-shaped spring 13 is employed for forcing the jaws together, the free ends of the spring having openings therethrough, through which the post 3 extends, the opening 14 in the upper member of the spring being enlarged so that said upper member will have free movement with respect to the post and further to engage and surround the ends 4 and 5 of the jaws when the jaws are moved together, and prevents separation of the jaws until such time as the spring is again depressed.

In setting the trap, the jaws 1 and 2 are swung outwardly, after the upper member of the spring 13 has been depressed, until the hooked end of the trigger 12 engages the cross bar of the arm 9, when the end 5 of the jaw 2 will serve to hold the spring in its depressed position as said end extends horizontally across the face of the spring, the parts remaining in their set position until the trigger is released from the cross bar.

The animal in moving across the trap is caused to release the trigger 12 by providing a trip rope or wire 15, one end of said trip rope being attached to the upper end of the trigger 12, while the opposite end thereof is attached to the upper end of the jaw 1, thereby suspending the rope in such position as to be engaged by the animal as it moves over the trap and when so engaged, the hooked end of the trigger will be released from the cross bar, whereupon the tension of the spring will quickly throw the jaws toward each other and against the body of the animal between the jaws and in order to securely impale, and in most instances, kill the animal, the upper ends of the jaws are provided with prongs 16 and 17, respectively.

The prongs 16 and 17 extend inwardly and at right angles to the trend of the jaws, so that when the jaws are brought together, the prongs will enter the body of the animal and in most instances, will instantly kill the animal, but in any event, will securely hold the animal, together with the pressure of the jaws, until such time as the animal can be killed and removed from the trap and the prong 16 is preferably positioned at one side of the path of the prong 17, so that the jaws can come together without interference, the upper end of the jaw 1 being preferably curved outwardly as shown in Fig. 2 to dispose the prong 16 out of the path of the opposite prong.

It will thus be seen that I have provided a very strong and durable form of trap and one that can be very cheaply constructed and it will likewise be seen that by providing the prongs at the ends of the jaws and directing the lower ends of the jaws in such position as to cause the spring to exert its tension on the jaws at all times, the animal will be securely held by the jaws after the trap has been sprung.

It will further be seen that the jaws may be quickly and expeditiously set in their open position as the jaws may be employed for depressing the spring by directing outward pressure on the jaws, as since the upper end of the trigger is weighted as shown, the hooked end thereof will automatically engage the cross bar as soon as the jaw has been opened.

What I claim is:

A trap of the character described, consisting of a bifurcated post, means for the support of said post in effective position, a pair of jaws pivoted to said post, within its bifurcation, at their inner ends, said jaws being angular in general outline and provided at their outer ends with angular points, one of said points being offset out of alinement with the longitudinal plane of its jaw, a spring having opposed apertured ends, the apertures thereof receiving said post, the ends of said spring being arranged below said jaws, one of said ends being adapted to deliver its stress or pressure upon the latter, a lateral arm secured to the support of said post and having an upward and outward inclination, a trigger pivoted to one of said jaws near its outer end and adapted to effect engagement with the outer end of said arm, and connecting means between said trigger and the other jaw, said connecting means being adapted when subjected to pressure for releasing said trigger from said arm.

In testimony whereof I have signed my name to this specification in the presence of two subscribing witnesses.

NILS A. BOE.

Witnesses:
ANTHON ARNESEN,
OLE K. LIEN.